United States Patent
Lemois et al.

(10) Patent No.: US 6,680,966 B2
(45) Date of Patent: *Jan. 20, 2004

(54) SPREAD-SPECTRUM TRANSMISSION SYSTEM WITH FILTERED MULTI-CARRIER MODULATION

(75) Inventors: Emmanuel Lemois, Paris (FR); Fabien Buda, Paris (FR); Joël Richard, Taverny (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,250

(22) Filed: Oct. 15, 1999

(65) Prior Publication Data

US 2003/0215001 A1 Nov. 20, 2003

(30) Foreign Application Priority Data

Oct. 16, 1998 (FR) .......................................... 98 13028

(51) Int. Cl.$^7$ ............................................... H04B 1/69
(52) U.S. Cl. ........................ 375/141; 375/130; 375/140
(58) Field of Search ................................. 375/206, 208, 375/240, 141, 146–153, 145, 143, 140, 130, 142, 260, 343, 367; 370/203, 208, 209, 320, 335, 342, 441

(56) References Cited

U.S. PATENT DOCUMENTS

| | | | | |
|---|---|---|---|---|
| 4,736,390 A | * | 4/1988 | Ward et al. .................... | 375/75 |
| 4,881,222 A | * | 11/1989 | Goeckler et al. .............. | 370/70 |
| 5,325,394 A | * | 6/1994 | Bruckert ......................... | 375/1 |
| 5,612,972 A | * | 3/1997 | Fukushi et al. .............. | 375/206 |
| 6,128,351 A | * | 10/2000 | Jones et al. .................. | 375/284 |
| 6,215,819 B1 | * | 4/2001 | Hyakudai et al. ............ | 375/240 |
| 6,304,611 B1 | * | 10/2001 | Miyashita et al. ........... | 375/260 |
| 6,389,000 B1 | * | 5/2002 | Jou ............................. | 370/342 |
| 2002/0114270 A1 | * | 8/2002 | Pierzga et al. .............. | 370/208 |

OTHER PUBLICATIONS

M. K. Simon, et al.: "Spread Spectrum Communications" Computer Sciences Press, 1988.

(List continued on next page.)

Primary Examiner—Stephen Chin
Assistant Examiner—Sam K. Ahn
(74) Attorney, Agent, or Firm—Sughrue Mion, PLLC

(57) ABSTRACT

The invention provides a spread-spectrum transmission system with multiple carrier modulation in which the signals for transmission over each of the subcarriers are filtered prior to being transmitted over the subcarrier, thereby making it possible on reception to synchronize the various subcarriers in time, and in which each subcarrier carries a plurality of chips that result from spreading a single symbol. With coherent modulation, the number of chips resulting from spreading a single symbol and transmitted over each subcarrier is selected so as to enable the various subcarriers to be put into phase alignment by recombining the chips coming from the same symbol on each subcarrier. With differential modulation, the transmission over each subcarrier of chips resulting from spreading a single symbol provides resistance to jamming by limiting recombination losses because of the differential modulation.

5 Claims, 4 Drawing Sheets

OTHER PUBLICATIONS

John P. Proakis, "Digital Communications", third edition, McGraw–Hill International Editions, Electrical Engineering Series, 1995.

G. Cariolaro et al, "An OFDM Scheme with a Half Complexity", IEEE Journal on Selected Areas in Communications, vol. 13, No. 9, Dec. 1, 1995, pp. 1856–1599, XP000543157.

R. Vallet et al, Fraction Spaced Multi–Carrier Modulation, Wireless Personal Communications, vol. 2, No. 1/02, Jan. 1, 1995, pp. 97–103, XP000589614.

S. Kondo et al, Multicarrier DS CDMA Systems in the Presence of Partial Band Interference, 1994 IEEE Milcom, Conference Record (CAT. No. 94CH34009), Proceedings of Milcom '94, Fort Monmount, NJ, Oct. 2–5, 1994, pp. 588–592, vol. 2 XP002106545.

A. Chouly et al, "Orthogonal Multicarrier Techniques Applied to Direct Sequence spread Spectrum CDMA Systems", Proceedings of the Global Telecommunications Conference (Globecom), Houston, Nov. 29 –Dec. 2,1993, vol. 3, Nov. 29, 1993, pp. 1723–1728, XP000436106.

* cited by examiner

FIG_1 PRIOR ART
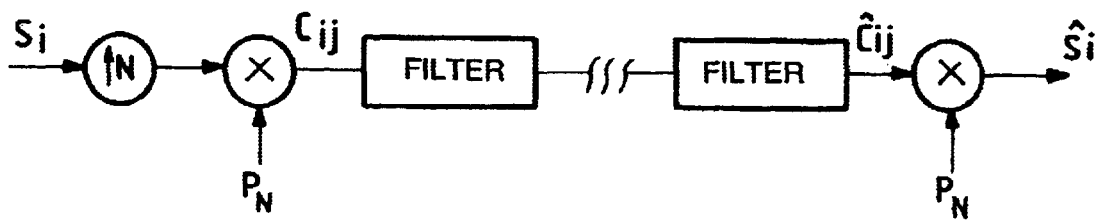
FIG_2 PRIOR ART
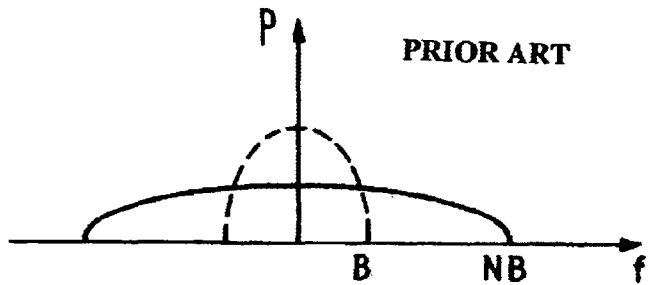
FIG_3 PRIOR ART
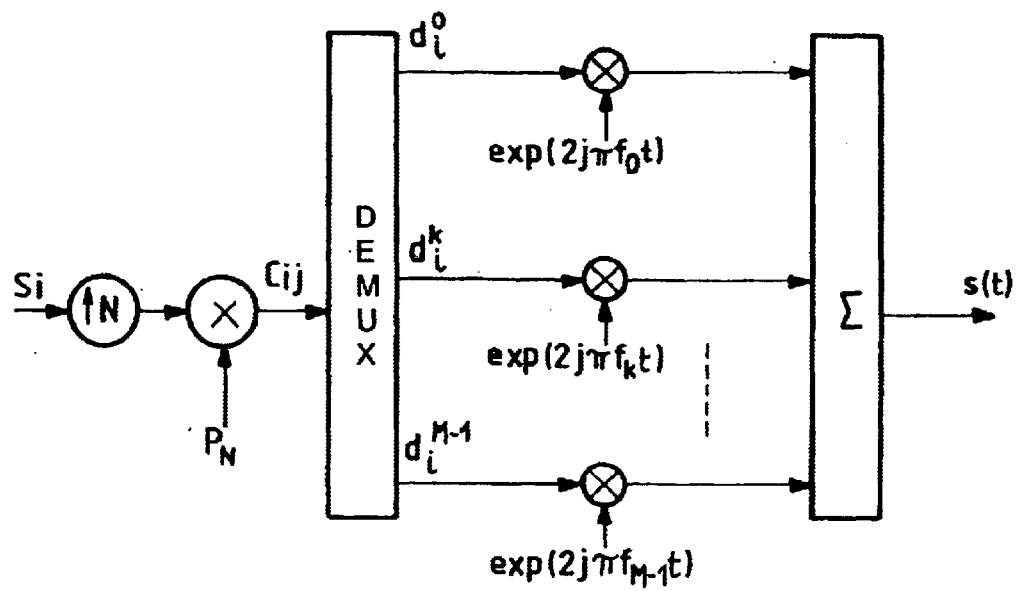

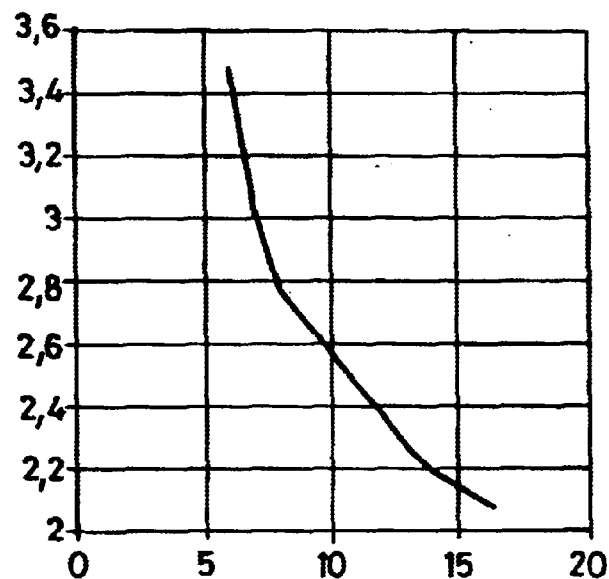
FIG_12
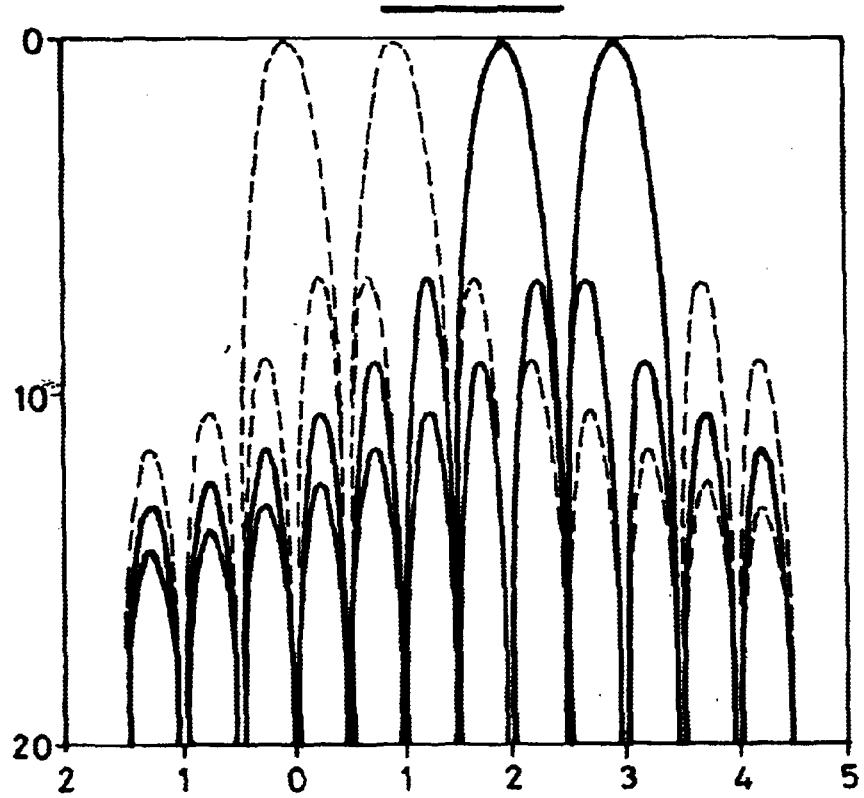
FIG_4

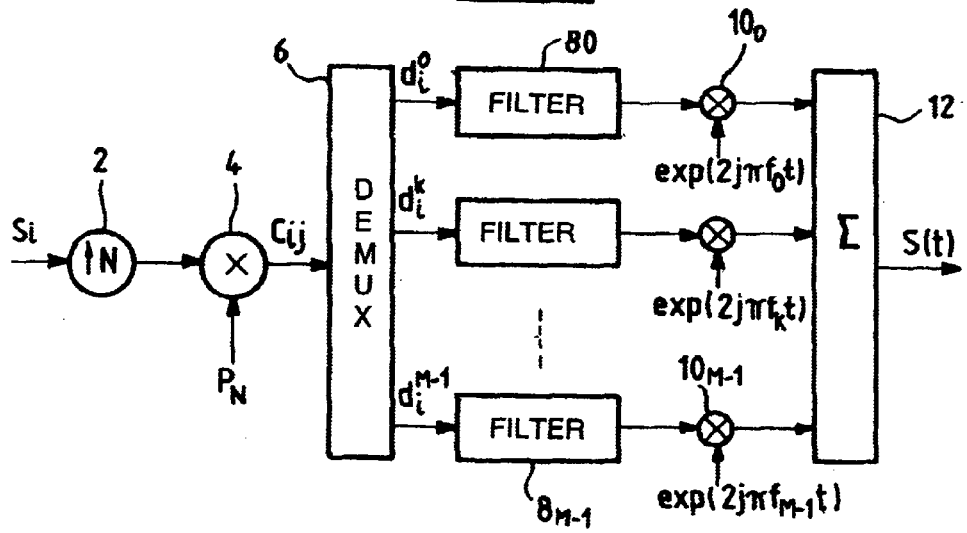
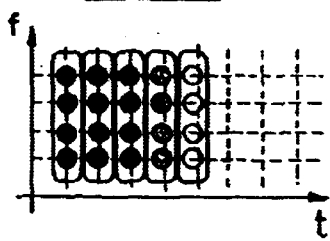 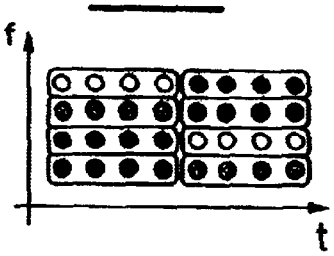 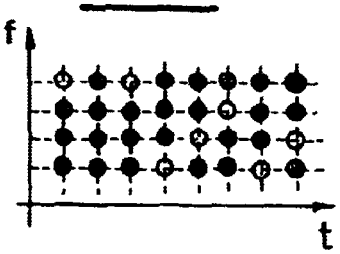
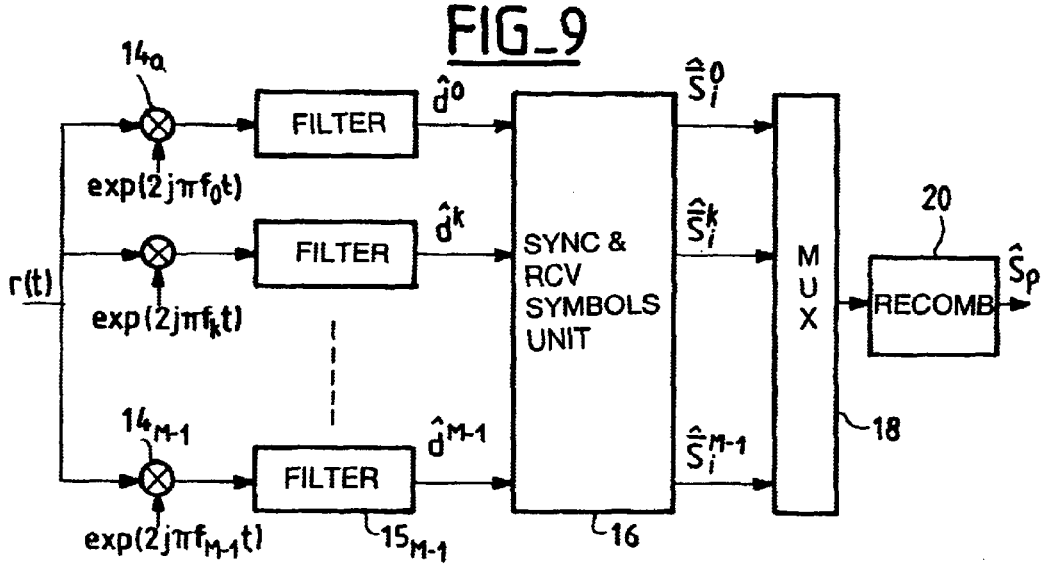

FIG_10
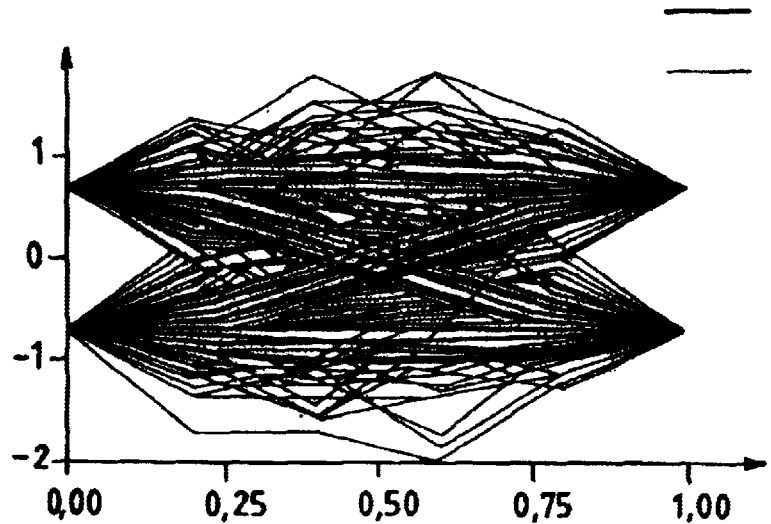
FIG_11
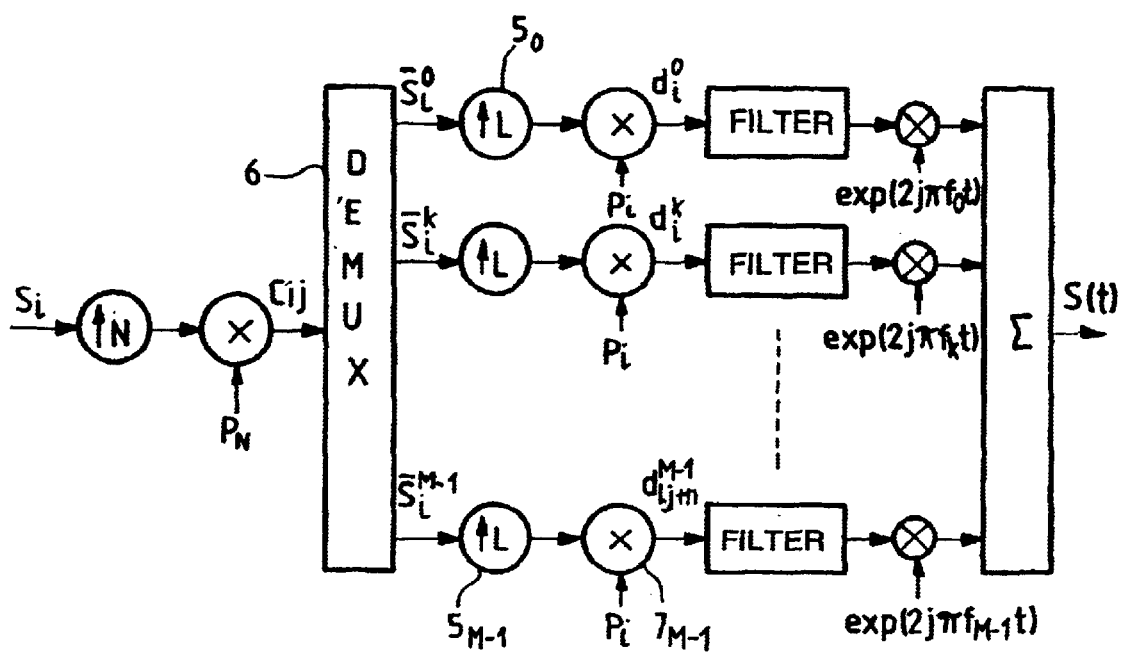

SPREAD-SPECTRUM TRANSMISSION SYSTEM WITH FILTERED MULTI-CARRIER MODULATION

The present invention relates to the field of radio transmission, and more particularly to the field of military tactical transmission. Transmission of such a type needs to be able to satisfy constraints in addition to those of conventional radio transmission; it must be capable of being implemented on numerous types of transmission channel, and in particular on frequency-selective channels. It must be discreet, and it must withstand jamming as well as possible. Finally, it is necessary for transmission of this type to guarantee that the system is robust in terms of ease of acquiring and maintaining synchronization.

BACKGROUND OF THE INVENTION

To withstand jamming, it is known to use spectrum-spreading techniques. These techniques are described, for example, by M. K. Simon et al. in "Spread spectrum communications" published by Computer Sciences Press, 1988. One of the problems with such spreading techniques is that when the signals are unspread, a fraction of the energy from the jammer is recovered in the form of noise. This can be a problem with very high power jammers.

Another problem with spreading techniques is the usual assumption that the transmission channel is without distortion no longer applies to the broad band of a spread signal. Solutions have already been proposed to this problem, and the receiver known as a "rake" receiver makes it possible in particular to eliminate disturbances due to multiple paths in the spread signal. This technique is described, for example, by John P. Proakis in "Digital communications", third edition, published by McGraw-Hill International Editions, Electrical Engineering Series, 1995.

FIG. 1 is a block diagram of a known spreading technique. The symbols $S_i$ of the signal of period T are initially oversampled, prior to be multiplied by an encoding sequence, e.g. a sequence $P_N$ of pseudo-random noise. Chips $c_{i,j}$ of period T/N are then transmitted over the channel. On reception, synchronization is performed using the self-correlation properties of the sequence $P_N$, after which it is possible to multiply the received chips $\hat{c}_{i,j}$ by the sequence $P_N$ to obtain the estimated symbols $\hat{S}_i$.

A signal occupying a frequency band 2B is spread out into a signal occupying a frequency band 2NB. FIG. 2 shows the appearance of the initial spectrum of the symbols in dashed lines, and the appearance of the spectrum after spreading in continuous lines.

For modems having a plurality of spreading modes, of the kind used in military tactical transmission systems, it is conventional to propose two different types of equalization algorithm. A first type of algorithm is used for non-spread signals, while another type of algorithm, e.g. the algorithm implemented in a "rake" receiver, is used for spread signals.

It is also known to perform multi-carrier transmission using spectrum spreading, as shown in FIG. 3. As is in FIG. 1, the symbols $S_i$ are oversampled, and then multiplied by the sequence $P_N$; however, the chips are not sent directly over the channel as in the case of FIG. 1, but they are demultiplexed and distributed over a plurality of subcarriers; the chips $d_i^k$ for transmission on subcarrier k are modulated thereon by being multiplied by exp $(2j\pi f_k t)$; the modulated subcarriers are then summed prior to being sent over the channel. On reception, it is necessary to perform synchronization in time and in frequency on the various subcarriers so as to enable the various chips to be reconstructed in phase. Thereafter, the chips can be recovered on each subcarrier and then remultiplexed, after which the procedure is the same as for reception in the diagram of FIG. 1. An example of such a technique is given by A. Chouly et al. in "Orthogonal multicarrier techniques applied to direct sequence spread spectrum CDMA-systems", Globcom 1993, pp. 1723–1728.

In civilian applications, where discretion is not a problem, synchronization solutions are known. For time synchronization, it is possible to stop the signal from time to time, and then to perform envelope detection at the receiver. For frequency synchronization at the receiver, it is possible to send a subcarrier with greater power at certain times, or to extinguish all of the subcarriers except for one at a given moment. Those solutions have the advantage of being easy to implement. However, they do not satisfy the discretion constraint that applies to military systems. In addition, they are not appropriate to getting rid of any jamming.

When the technique of multicarrier modulation with cyclical extension is used, it is also possible in some cases to use known algorithms that make it possible to recover the frequency and the clock rate from the subcarriers. In addition to their specific character, those solutions do not operate at low signal-to-noise ratios, which are typical of spectrum spreading.

In conventional manner, the functions of demultiplexing, of modulating the subcarriers, and of adding together the modulated subcarriers can be performed by the fast Fourier transform, as represented by the curly brace on FIG. 3. As a result, cardinal sine (sinc) subcarriers are obtained of width 2N/MT and spaced apart by N/MT, using the same notation.

In dashed lines, FIG. 4 shows the spectrum of the spread multicarrier signal obtained in a circuit of the type shown in FIG. 3; frequency is plotted along the abscissa which is graduated in multiples of 2NB/M. The ordinate gives the spectrum power density in dB. A spectrum is obtained that is made up of M arches of unit width 2NB/M, where M is the number of subcarriers. As can be seen in the figure, the arches overlap. An appropriate choice for the value M giving the number of subcarriers makes it possible to transmit each subcarrier under conditions where the assumption of a distortion-free channel is satisfied. This makes it possible to avoid the equalization problems encountered in spreading techniques.

R. Vallet and K. Haj Taieb in "Spaced multicarrier modulation, special issue on multicarrier communication" published by Ecole Nationale supérieure des télécommunications, 1994, propose a digital implementation of a multicarrier modulation technique using QAM type modulation and a pulse-shaping function with a Nyquist filter. That article proposes associating a fast Fourier transform with a polyphase filter. Such a solution using filtered multiple carriers still implies synchronization which is neither discreet nor robust, as explained above.

OBJECTS AND SUMMARY OF THE INVENTION

The invention proposes a solution to the problem of synchronizing subcarriers in a spread spectrum multicarrier transmission system for military applications. It makes it possible to satisfy the discretion constraints that are imposed in military applications.

With differential demodulation, the invention makes it possible to limit the recombination loss caused by the differential demodulation, while still conserving adequate resistance to jamming.

More precisely, the invention provides a spread-spectrum transmission system with multiple carrier modulation in which the signals for transmission over each of the subcarriers are filtered prior to being transmitted over the subcarrier, thereby making it possible on reception to synchronize the various subcarriers in time, and in which each subcarrier carries a plurality of chips that result from spreading a single symbol.

In an embodiment, the various subcarriers are subjected to coherent modulation, and each subcarrier carries a number of chips that result from spreading a single symbol, which number is sufficient to enable the various subcarriers to be brought into phase alignment by recombining chips coming from a single symbol on each subcarrier.

In another embodiment, the various subcarriers are subjected to differential modulation, and each subcarrier carries a number of chips resulting from spreading a single symbol, which number is sufficient to provide resistance to jamming by limiting recombination losses because of the differential modulation.

Advantageously, said signals are filtered by lowpass filters ensuring that the spectra of the subcarriers remain distinct.

The signals can be filtered by Nyquist root filters.

BRIEF DESCRIPTION OF THE DRAWINGS

Other characteristics and advantages of the invention will appear on reading the following description of embodiments of the invention given by way of example and with reference to the accompanying drawings, in which:

FIG. 1 is a block diagram of a known spreading technique;

FIG. 2 shows the appearance of the spectra in the device of FIG. 1;

FIG. 3 is a block diagram of a transmission technique using multiple carriers and spectrum-spreading;

FIG. 4 shows the appearance of the spectra in the FIG. 1 device;

FIG. 5 is a block diagram showing the transmitter means of a transmission system implementing the invention;

FIGS. 6 to 8 are diagrams showing how chips are distributed over the various subcarriers;

FIG. 9 is a block diagram of receiver means in the FIG. 5 system, for coherent demodulation, FIG. 10 is an eye diagram in a transmission system of the invention;

FIG. 11 is a block diagram of transmitter means in a transmission system of the invention, with two successive stages of spreading; and FIG. 12 is a graph showing recombination loss for the case of QPSK modulation.

MORE DETAILED DESCRIPTION

In a spread spectrum transmission system, the invention proposes replacing conventional multicarrier modulation as described with reference to FIG. 3 by filtered multicarrier modulation. A suitable distribution of chips over the various subcarriers then makes it possible to implement receiver synchronization algorithms independently on each of the subcarriers.

FIG. 5 is a block diagram of a spread spectrum transmission system implementing the invention. As in FIG. 3, this diagram shows input symbols $S_i$. These symbols are typically real or complex symbols from linear modulation such as M state phase shift keying (M-PSK) or M-state quadratic amplitude modulation (M-QAM). The received symbols $S_i$ are oversampled, as represented by 2 in the figure, and they are then multiplied by a spreading sequence $P_N$ to obtain chips $c_{i,j}$ as shown at 4 in the figure. The notion $P_N$ does not imply that the spreading sequence is of a length identical to the period of one symbol. It can extend over a plurality of symbols, or it can be of a length that is shorter than the period of one symbol.

The chips are then demultiplexed, i.e. they are shared between the various subcarriers as symbolized at 6 in the figure by chips $d_i^k$, and as explained in greater detail below. The number of subcarriers over which a symbol is distributed can vary, and the exponent k does not imply that a symbol is distributed over all M subcarriers.

In the invention, the chips $d_i^k$ for transmission over each of the various subcarriers are filtered as represented at $8_k$ in the figure. The filtering is typically raised cosine root or Nyquist root filtering. More generally, it is possible to use any form of filtering that enables the spectral shape of each subcarrier to be determined, so as to limit the bandwidth of each subcarrier and so as to ensure that the spectra of the subcarriers remain distinct. The filter also has the function of avoiding interference between symbols. Filtering also makes it possible to perform time synchronization on each subcarrier, as explained below.

Using the notation $f_k$, $0 \leq k \leq M-1$, for the carrier frequencies, it is advantageous to select a filter such that attenuation caused by the filters at the frequency $(f_k+f_{k-1})/2$ achieves a typical value of 30 dB. Such a value makes it possible for the level of interference generated on a given subcarrier by the adjacent subcarriers to be limited to a level that makes synchronization of the subcarriers possible.

The result can be verified, e.g. by extinguishing a subcarrier and measuring the energy in the band of the extinguished subcarrier. It is also possible to verify that subcarrier synchronization is possible, e.g. by changing the filters and measuring bit error rates. An increase in error rate means that synchronization is incorrect.

The filtered chips for each of the subcarriers are then transmitted on each of the subcarriers, as represented in the figure by the multipliers $10_k$ which multiply the filtered chips by $\exp(2j\pi f_k t)$. The modulated subcarriers are then summed, and the sum s(t) is transmitted over the channel as represented by 12 in the figure.

The invention seeks to select the way in which the chips for each symbol are distributed over the various subcarriers so as to make coherent reconstruction of the symbols possible on reception, even in the absence of time and frequency synchronization for each of the subcarriers. Each of FIGS. 6 to 8 is a chart showing one possible way of distributing chips over the various subcarriers. The three charts of the figures lie in the time-frequency plane, with time being along the abscissa and frequency up the ordinate. The various chips are represented in this plane by circles, each of a color representing the symbol of which it forms a part. In the figure, each symbol is spread over four chips, and eight symbols are taken into consideration. FIG. 6 shows a distribution of the chips over the various subcarriers in which all of the chips of a given symbol are distributed over a plurality of different subcarriers at the same instant. FIG. 7 shows a distribution in which the chips of each symbol are all carried by the same subcarrier, but at different instants. FIG. 8 shows an intermediate situation in which the various chips of a given symbol are distributed over two subcarriers, and at different instants.

As explained below, the invention proposes grouping together at least some of the chips of a given channel on the same subcarrier. In the extreme, it is possible for all of the chips of a particular symbol to be grouped together on a single subcarrier, as shown in FIG. 7. It is also possible to proceed as shown in FIG. 8.

By grouping together the chips of a symbol on the same subcarrier, it is possible to recombine the chips without any need to synchronize the various subcarriers. The chips of the same symbol as sent over the same subcarrier are all subject on reception to the same phase shifts, so they can be recombined without knowing the phase shift. Using the notation $P_N$ for the spreading sequence, the portion of the symbol received on the subcarrier of order k by recombining the chips is obtained by the formula:

$$\hat{S}_i^k = \sum_{m=0}^{N'-1} \hat{d}_{i,m}^k \times p_{N,m} \tag{1}$$

where $\hat{S}_i^k$ is the estimate of the portion of the symbol $S_i$ transmitted over the subcarrier of order k, $\hat{d}_{i,m}^k$ represents the chips received on the subcarrier of order k, and N' represents the recombination length, i.e. the number of chips for a given symbol that are sent over the same subcarrier. $N' \leq N$, and the value of N' can be set in the manner explained in the description below.

FIG. 9 is a block diagram of receiver means for the FIG. 5 system when coherent demodulation is used. The input of the receiver receives the chips r(t) as transmitted over the channel. Each subcarrier is demodulated as represented by 14 in the figure so as to recover the received chips. The chips are filtered by a shaping filter, typically matching the filter used on transmission. The filtered signals $\hat{d}_i^k$ are synchronized independently on each subcarrier. For this purpose, it is possible to use algorithms and solutions that are already known for single carrier transmission systems. Once synchronization has been acquired, the chips coming from the same symbols are recombined on each subcarrier in application of above formula (1). Reference 16 in the figure shows the block for synchronizing and receiving symbols, which block provides a value $\hat{S}_i^k$ for each symbol where i indexes the symbol and k the subcarrier. This value is representative of the sum of the chips of a symbol $S_i$ which are transmitted over the subcarrier of order k.

The contributions from each subcarrier to a given symbol are then recombined, at 20 in the figure, after being reassembled at 18, so as to obtain an estimated value $\hat{S}_i$ for each received symbol. The various portions of a symbol coming from the various subcarriers are recombined while taking account of the phase shift of each subcarrier. The presence of a minimum number of chips from the same symbol on each subcarrier nevertheless makes it possible to obtain on each subcarrier sufficient energy to enable algorithms to be implemented for determining phase offsets between the various subcarriers. In other words, because of the way chips are grouped together, the invention makes it possible to align the phases of various carriers. However, because the chips are shared between subcarriers, they also provide good discretion and good resistance to jamming.

Thus, the filtering of signals for each subcarrier, and the selected manner of distributing the chips over the subcarriers make it possible on reception to synchronize each of the subcarriers and to put the various subcarriers into phase.

FIG. 10 is an eye diagram showing the effects of the filtering of the invention. The eye diagram of the figure corresponds to orthogonal frequency division multiplex (OFDM) transmission of 64 subcarriers with a symbol time of T. An eye is shown for the case of four samples per symbol. The dotted lines show the eye diagram without filtering, while the bold lines show the eye diagram after filtering by a raised cosine root polyphase filter with a rolloff factor of 0.5T over 9T. It can be seen in the figure that the eye diagram when filtering is used is quite open, thereby making effective time synchronization of a subcarrier possible.

The number of chips of the same symbol that should be chosen for transmission over a given subcarrier depends on the particular implementation of the invention, and in particular:

on the signal-to-noise ratio;
on the demodulation used;
on the desired effectiveness against jamming;
on the desired discretion; and
on the data rate.

Other things being equal, the number of chips of the same symbol to be transmitted over the same subcarrier decreases as the signal-to-noise ratio increases; this number decreases if it is desired to achieve improved effectiveness against jamming, insofar as jamming may apply to a given subcarrier.

From the point of view of discretion, the system is more discreet when the energy of each chip transmitted over a subcarrier is small. Nevertheless, it is important for the chips of the same symbol as recombined on the same subcarrier to have sufficient energy. As a result, other things being equal, the number of chips of the same symbol on a given subcarrier increases with increasing discretion. Using the notation:

$E_c$ for chip energy;
$E_s$ for the energy of the chips of the same symbol as transmitted over the same subcarrier; and
$N_0$ the noise on a carrier, the following obtains:

$$\frac{E_s}{N_0} = N' \frac{E_c}{N_0}$$

where N' is the above-mentioned number. For QPSK modulation with a fixed $E_c/N_0$ ratio, N' preferably ensures that $E_s/N_0$ is greater than or equal to 0 dB, thus making it possible to achieve phase alignment for a data rate on a subcarrier of a few thousand recombined symbol portions $\hat{S}_i^k$ per second. A value of about 0 dB ensures good anti-jamming effectiveness, and a value of about −5 dB provides good discretion.

The number of chips of the same symbol on the same subcarrier also varies as a function of data rate. An increase in data rate makes the system less sensitive to phase noise, and makes it possible to decrease the number of chips of the same symbol on the same subcarrier that are necessary for ensuring phase alignment.

The result, the capacity for putting into phase the various portions of a symbol coming from different subcarriers, can be verified directly using conventional means for evaluating the performance of a link, as are well known to the person skilled in the art, thereby giving a quality factor or a bit error rate. Other things being equal, varying the number of chips of the same symbol per carrier makes it possible, by measuring performance, to verify whether the system is operating.

The example of FIG. 11 shows an easy way of sharing chips of the same symbol over different subcarriers. It is a block diagram showing transmitter means of a transmission system of the invention: spreading is performed therein in two stages. In a first stage, the symbols are subjected to first spreading, and they are shared into sequences on the various subcarriers. Thereafter, on each subcarrier, the symbols are subjected to second spreading, sequence by sequence, for each subcarrier. FIG. 11 shows the same elements as FIG. 5. Nevertheless, the symbols spread by a factor N into chips $\bar{S}_j^k$ are shared by the demultiplexer 6 over the various subcarriers and are then oversampled again by a factor L in the oversamplers $5_k$, and they are spread a second time by being multiplied by a second spreading sequence $P_L$ in the multipliers $7_k$ so as to obtain chips $d_i^k$ on each subcarrier k. The chips obtained in this way are then filtered, as in the embodiment of FIG. 5.

In the FIG. 11 circuit, each symbol is subjected to spreading over N×L chips by the combination of two successive spreading stages. This circuit ensures that each subcarrier has at least L successive chips of the same symbol. The ratio between N and L can vary depending on the implementation of the invention, as explained above. It will be observed that in this case, the second spreading over the various subcarriers can also be performed with sequences that differ as a function of subcarrier.

This makes it easy to control the minimum number of chips of each symbol in a subcarrier.

In the description above, only coherent modulation has been considered. The use of differential modulation makes it possible to solve the problem of phase shifts between the various subcarriers; nevertheless it gives rise to recombination loss, as described below. For differential modulation of the chips transmitted over each channel, it is possible to use a circuit of the same kind as that shown in FIG. 9. Nevertheless, instead of summing the chips of the same symbol on the same carrier, the contributions given by the product of a chip multiplied by the complex conjugate of the preceding chip are summed. In other words, differential demodulation is performed prior to summing the chips.

It is also possible to perform differential modulation and demodulation, not on the chips transmitted over each subcarrier as mentioned above, but on blocks of chips, and for example on the chips that result from the first spreading in the circuit of FIG. 11, as now explained.

By way of example, we consider symbols $S_i$ which, after a first stage of spreading are distributed over subcarriers, with a subcarrier of order k carrying the portion $S_i^k$ of the symbol $S_i$. The number of subcarriers over which a symbol is distributed can vary, and the index k does not imply that a symbol is distributed over all M subcarriers. The chips $S_i^k$ resulting from the first stage of spreading, or from the distribution of the symbol between the subcarriers, are then subjected to differential encoding supplying a differentially modulated chip $D_i^k$ where:

$$D_i^k = S_i^k \times D_{i-1}^{k*}$$

The chips from the first stage of spreading, after differential modulation, are subjected to a second stage of spreading by a sequence $P_k$ which can depend on subcarrier, said sequence advantageously extending over a plurality of chips $S_i^k$ or $D_i^k$ that result from the first stage of spreading.

Using the notation $P_{k,j}$ for the jth element of the spreading sequence $P_k$, chips $c_{i,j}^k$ are then transmitted over the subcarrier k where:

$$D_i^k = \Sigma_j c_{i,j}^k \times P_{k,j}$$

The chips that result from the second stage of spreading are transmitted over the subcarrier and they are received by the receiver on each subcarrier, and they are estimated to have the value $\hat{c}_{i,j}^k$. After filtering, the estimated value $\hat{D}_i^k$ is calculated as given by:

$$\hat{D}_i^k = \Sigma_j \hat{c}_{i,j}^k \times P_{k,j}$$

Thereafter differential demodulation is performed on the $\hat{D}_i^k$ using the relationship $$\hat{S}_i^k = \hat{D}_i^k \times \hat{D}_{i-1}^{k*}$$

This differential demodulation gives rise to recombination loss, which loss is a function of the spreading factor used. More precisely, using the notation N for the spreading factor of the first stage of spreading and L for the spreading factor for the second stage of spreading, as above, the recombination loss is an increasing function of the spreading factor N, in other words of the number of subcarriers over which the symbol is shared.

For differential modulation, and using the notation:

$E_c$ for the energy of one chip;

$E_s$ for the energy of the chips of the same symbol that are transmitted over the same subcarrier; and $N_0$ for the noise on a carrier, then:

$$\frac{E_s}{N_0} = L\frac{E_c}{N_0}$$

Where, as in the circuit of FIG. 11, L is the number of same-symbol chips to be found on a given subcarrier.

The recombination loss caused by differential modulation and demodulation is a function of the ratio $E_s/N_0$. For the case of QPSK modulation, the appearance of the corresponding function is shown in FIG. 12 where the abscissa is graduated in dB and represents the quantity $E_s/N_0$. The ordinate is also graduated in dB and represents the recombination loss. It can be seen in the figure that the recombination loss is a decreasing function of the ratio $E_s/N_0$, i.e. for constant $E_c/N_0$, and for a constant product N.L, it is an increasing function of the number N.

The values chosen for N and L when using differential demodulation must satisfy the following constraints:

an increase in the value of the first spreading factor N increase recombination loss for constant energy for one symbol $S_i$ and for constant L; and an increase in the value of the first spreading factor N, and thus a corresponding decrease in the second spreading factor L causes jamming resistance to increase. Grouping together the chips of a symbol on a single subcarrier, or on a small number of subcarriers, makes the transmission system sensitive to jamming on a given subcarrier.

As with coherent modulation, the ratio chosen between the first and second spreading factors, i.e. the number of chips of a given symbol selected for transmission over the same subcarrier, is a compromise between resistance to jamming and recombination losses. It is therefore difficult to give a numerical value for this ratio which also depends:

on the signal-to-noise ratio;

on the demodulation used;

on the desired level of anti-jamming effectiveness;

on the desired level of discretion; and on the data rate.

As above, the result to be obtained can be verified immediately by the person skilled in the art.

The invention can also be implemented by devices other than those shown in the figures. For transmission it is possible to use an inverse Fourier transform followed by a polyphase filter to perform filtering of the signals destined for each subcarrier, subcarrier modulation, and the summing of the signals of the various subcarriers. Similarly, on reception it is possible to use a polyphase filter followed by a Fourier transform to recover the signals on each of the subcarriers and to perform reception filtering.

Naturally, the present invention is not limited to the embodiments described and shown, but it is susceptible of numerous variants within the competence of the person skilled in the art. In the embodiments described above, the notation used for the spreading sequences does not imply that these sequences have lengths of N or L chips. On the contrary, a spreading sequence can be longer or shorter, i.e. it can cover a plurality of symbols or less than one symbol.

What is claimed is:

1. A spread-spectrum transmission system with multiple carrier modulation, the system comprising a plurality of filters for filtering signals for transmission over subcarriers prior to being transmitted in order to enable synchronization of the subcarriers in time upon reception, wherein each of the subcarriers carries a plurality of chips that result from spreading a single symbol, and each of said filters is adapted to limit a level of interference generated on a given subcarrier by adjacent carriers by providing an attenuation of approximately 30 dB at a freguency $(f_k+f_{k-1})/2$, where $f_k$ is a carrier frequency for each of the subcarriers, $0 \leq k \leq M-1$, M is the number of subcarriers, k is an index of the subcarriers, and k and M are integers.

2. The system of claim 1, further comprising means for subjecting the subcarriers to coherent modulation, wherein each subcarrier carries a number of chips that result from spreading a single symbol, and the number of chips is sufficient to enable the subcarriers to be brought into phase alignment by recombining chips coming from a single symbol on each subcarrier.

3. The system of claim 1, further comprising means for subjecting the subcarriers to differential modulation, wherein each subcarrier carries a number of chips resulting from spreading a single symbol, and the number of chips is sufficient to provide resistance to jamming by limiting recombination losses because of the differential modulation.

4. The system according to claim 1, wherein said filters comprise lowpass filters which are adapted to provide that the spectra of the subcarriers remain distinct.

5. The system according to claim 1, wherein said filters comprise Nyquist root filters.

* * * * *